(12) United States Patent  (10) Patent No.: US 9,129,444 B2
Bakshi  (45) Date of Patent: Sep. 8, 2015

(54) GEOMETRICAL GRAPHICAL USER INTERFACE FOR DISPLAYING RELATED DATA

(71) Applicant: Kirit Bakshi, West Bloomfield, MI (US)

(72) Inventor: Kirit Bakshi, West Bloomfield, MI (US)

(73) Assignee: Kirit Bakshi, West Bloomfield, MI (US)

( * ) Notice: Subject to any disclaimer, the term of this patent is extended or adjusted under 35 U.S.C. 154(b) by 407 days.

(21) Appl. No.: 13/675,380

(22) Filed: Nov. 13, 2012

(65) Prior Publication Data

US 2013/0120446 A1    May 16, 2013

Related U.S. Application Data

(60) Provisional application No. 61/559,122, filed on Nov. 13, 2011.

(51) Int. Cl.
*G06T 11/60*    (2006.01)
*G09G 5/00*    (2006.01)
*G06T 11/20*    (2006.01)
*G06F 3/0482*    (2013.01)

(52) U.S. Cl.
CPC ............. *G06T 11/60* (2013.01); *G06F 3/0482* (2013.01); *G06T 11/206* (2013.01)

(58) Field of Classification Search
None
See application file for complete search history.

(56) References Cited

U.S. PATENT DOCUMENTS

| 6,448,987 B1 | 9/2002 | Easty et al. |
| 6,549,219 B2 | 4/2003 | Selker |
| 7,509,348 B2 | 3/2009 | Burtner et al. |
| 7,721,311 B2 | 5/2010 | Kowald et al. |
| 7,992,102 B1 | 8/2011 | De Angelo |
| 2011/0047014 A1* | 2/2011 | De Angelo ................... 705/14.4 |
| 2012/0173310 A1* | 7/2012 | Groetzinger et al. ........ 705/14.1 |

* cited by examiner

*Primary Examiner* — Mark Zimmerman
*Assistant Examiner* — Vu Nguyen
(74) *Attorney, Agent, or Firm* — Brooks Kushman P.C.

(57) ABSTRACT

A graphical user interface for interactively displaying large amounts of related data using a geometrical pattern is provided. The geometrical user interface permits users to view, navigate and interact with large amounts of related data in a single display window without going through multiple clicks, menus, drop-downs and scrolling events.

19 Claims, 7 Drawing Sheets

GEOMETRICAL GRAPHICAL USER INTERFACE FOR DISPLAYING RELATED DATA

CROSS-REFERENCE TO RELATED APPLICATIONS

This application claims the benefit of U.S. provisional Application No. 61/559,122 filed Nov. 13, 2011, the disclosure of which is incorporated in its entirety by reference herein.

TECHNICAL FIELD

The present application relates to a geometrical graphical user interface for interactively displaying large amounts of related data in a single display window.

BACKGROUND

Conventional methods of navigating related data typically require several mouse clicks, menu selections, drop-down lists and scrolling events to view desired content. For instance, a particular professional sports website requires a user to select a combination of tab(s), menus, drop-downs, clicks and scrolling events to view one specific category or data item (e.g., the weekly schedule for a particular team). Another series of similar input events is required to view another category or data item (e.g., league standings information, particularly if searching for the standings of a specific team's division). The amount of input events required to view, navigate and interact with digital content in these conventional interfaces can seem virtually endless.

SUMMARY

One or more embodiments of the present application are directed to a system and method for interactively displaying digital content on an electronic display device. The method may include formatting for display an electronic user interface including a central display region configured to display a generated result, a first content region at least partially peripherally surrounding the central display region, and a second content region at least partially peripherally surrounding the first content region. The first content region may include a plurality of first interface elements and the second content region may include a plurality of second interface elements. The method may further include receiving input corresponding to a cursor movement over at least one of the first and second interface elements, wherein the generated result is based at least in part on the input.

The plurality of second interface elements may include at least a first set of one or more second interface elements associated with a first primary information category and a second set of one or more second interface elements associated with a second primary information category. The second primary information category may be different from the first primary information category. Moreover, the first primary information category may be a user-independent information category and the second primary information category may be a user-dependent information category. Each second interface element may correspond to one or more first interface elements and each first interface element may be associated with a subcategory of its corresponding second interface element.

BRIEF DESCRIPTION OF THE DRAWINGS

FIGS. 3a-d illustrate various examples of an electronic user interface in accordance with one or more specific embodiments of the present application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Implementations of illustrative embodiments disclosed herein may be captured in programmed code stored on machine readable storage mediums, such as, but not limited to, computer disks, CDs, DVDs, hard disk drives, programmable memories, flash memories and other permanent or temporary memory sources. Execution of the programmed code may cause an executing processor to perform one or more of the methods described herein in an exemplary manner.

Figure 1:
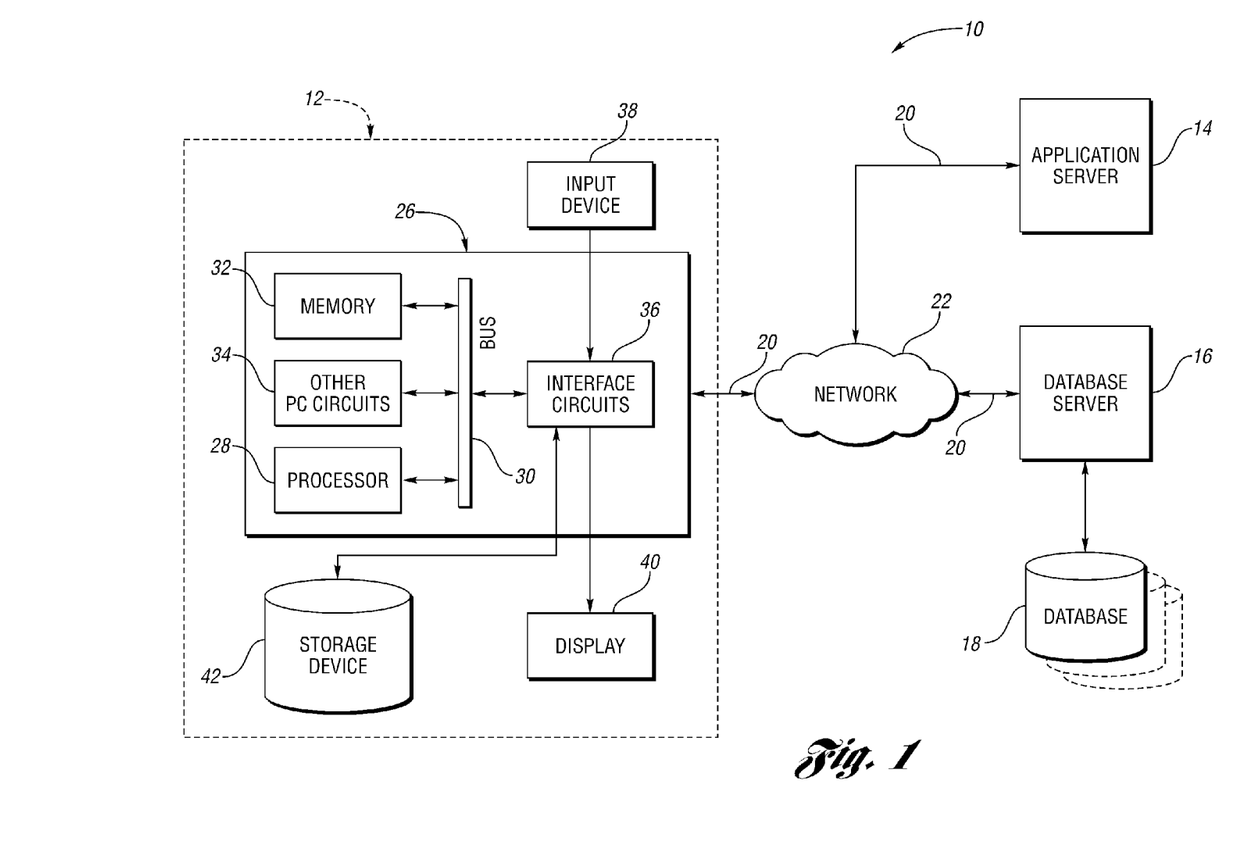
FIG. 1 is a simplified, exemplary block diagram of a computer system in accordance with one or more embodiments of the present application.

A high-level block diagram of an exemplary computer system 10 is illustrated in FIG. 1. In one or more embodiments, the system 10 can be implemented using a stand-alone client device 12 without a communications network. In one or more alternate embodiments, the system 10 can be implemented as a networked client-server communications system. To this end, the system 10 may include one or more client devices 12, one or more application servers 14, and one or more database servers 16 connected to one or more databases 18. Each of these devices may communicate with each other via a connection to one or more communications channels 20. The communications channels 20 may be any suitable communications channels such as the Internet, cable, satellite, local area network, wide area networks, telephone networks, or the like. Any of the devices described herein may be directly connected to each other and/or connected over one or more networks 22. While the application server 14 and the database server 16 are illustrated as separate computing devices, an application server and a database server may be combined in a single server machine.

One application server 14 may provide one or more functions or services to a number of client devices 12. Accordingly, each application server 14 may be a high-end computing device having a large storage capacity, one or more fast microprocessors, and one or more high-speed network connections. One function or service provided by the application server 14 may be a web application, and the components of the application server may support the construction of dynamic web pages.

One database server 16 may provide database services to the application server 14, the number of client devices 12, or both. Information stored in the one or more databases 18 may be requested from the database server 16 through a "front end" running on a client device 12, such as a web application. On the back end, the database server 16 may handle tasks such as data analysis and storage.

The client device 12 may be a personal computer, personal digital assistant (PDA), mobile phone and/or any other suitable computing device. The client device 12 may be configured to run a client program such as a web browser that can access the one or more functions or services provided by the application server 14. Moreover, the client device 12 may run a specific client program that provides a unique graphical user interface (GUI) for accessing information or other content stored either locally or at the application server 14 or the database server 16.

The client device 12 may include a main unit 26, which itself may include one or more processors 28 electrically coupled by an address/data bus 30 to one or more memory devices 32, other computer circuitry 34, and/or one or more interface circuits 36. The processor 28 may be any suitable microprocessor. The memory device 32 may include volatile memory and nonvolatile memory. The memory device 32 and/or another storage device may store software instructions that interact with the other devices in the system 10 as described herein. The software instructions may be executed by the processor 28 in any suitable manner. The memory device 32 and/or another storage device may also store one or more data structures, digital data indicative of documents, files, programs, web pages, and the like retrieved from another computing device and/or loaded via an input device.

The exemplary memory device 32 may store software instructions, web pages, user data, and other information for use by the system 10 as described in detail below. Many other data fields or records may be stored in the memory device 32 to facilitate implementation of the system and methods disclosed herein. In addition, any type of suitable data structure (e.g., a flat file data structure, a relational database, a tree data structure, etc.) may be used to facilitate implementation of the system and methods disclosed herein.

The interface circuit 36 may be implemented using any suitable interface standard, such as an Ethernet interface and/or a universal serial bus (USB) interface. One or more input devices 38 may be connected to the interface circuit 36 for entering data and commands into the main unit 26. For example, the input device 38 may be a keyboard, mouse, touchscreen, trackpad, trackball, isoprint, voice recognition system, or the like.

One or more displays 40 may also be connected to the main unit 26 via the interface circuit 36. The display 40 may be a cathode ray tube (CRT), liquid crystal display (LCD), or any other suitable display. The display 40 may present a GUI for displaying data generated during operation of the client device 12.

One or more storage devices 42 may also be connected to the main unit 26 via the interface circuit 36. For example, a hard drive, CD drive, DVD drive, flash memory drive, and/or other storage devices may be connected to the main unit 26. The storage devices 42 may store any type of data used by the client device 12.

The client device 12 may also exchange data with other computing devices and/or other network devices (e.g., the application server 14 or the database server 16) via a connection to the communication channels 20. The communication channels 20 may be any type of network connection, such as an Ethernet connection, WiFi, WiMAX, digital subscriber line (DSL), telephone line, co-axial cable, or the like. One or more attributes of the exemplary client device 12 may also be present in a server, such as the application server 14 or the database server 16.

Figure 2:
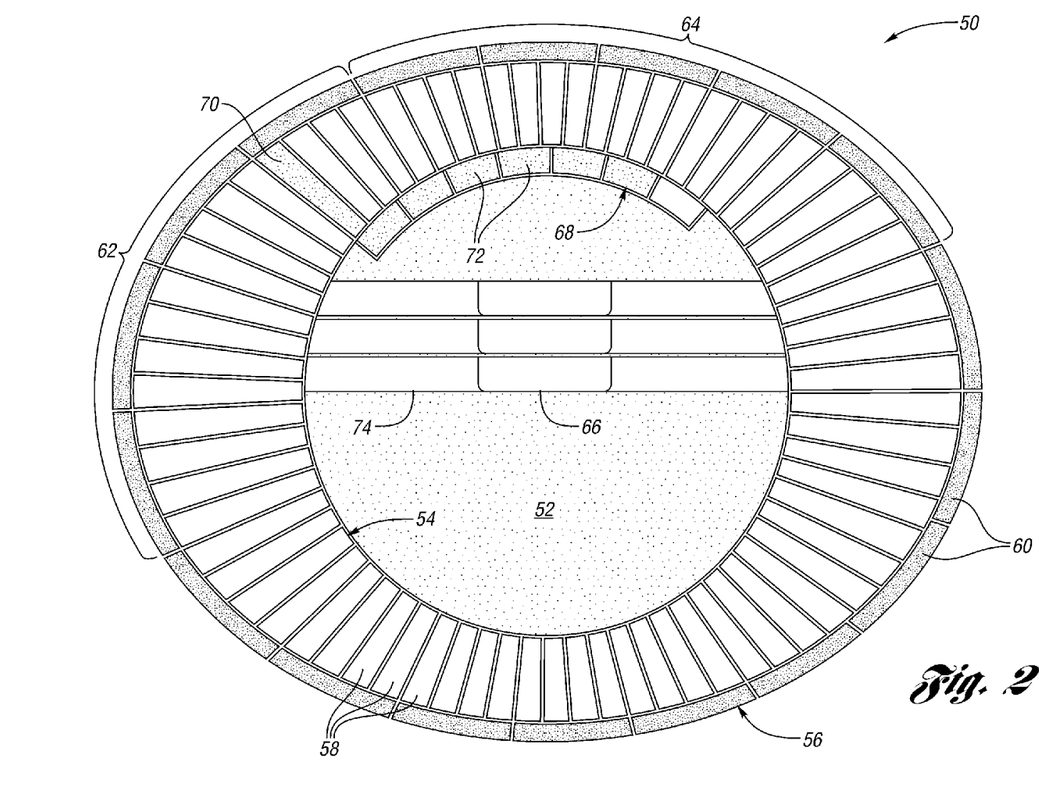
FIG. 2 is an exemplary electronic user interface in accordance with one or more general embodiments of the present application.

FIG. 2 illustrates an exemplary electronic user interface 50 in accordance with one or more embodiments of the present application. The electronic user interface 50 may be a graphical user interface for interactively displaying a large amount of related data in a geometrical pattern. As previously described, client device 12 may run a client program that generates the user interface 50 for displaying data in a unique manner. The client program may be a dedicated application for providing the user interface 50. Alternatively, the client program may be a web browser for accessing a web-based application providing the user interface 50. As will be described, the user interface 50 may allow a user to view, navigate and interact with large amounts of related data with or without the use of a communications network.

The user interface 50 may be composed of a number of interface elements. An interface element may refer to a software-based component of the user interface in which a user interacts. For example, an interface element may provide a single interaction point for manipulating a given kind of data. Each interface element may be relationally linked to other interface elements as well as to data contained in one or more databases of related data.

As shown in FIG. 2, the user interface 50 may include a central display region 52, a first content region 54 peripherally surrounding the central display region 52, and a second content region 56 peripherally surrounding the first content region 54. Although generally shown in the shape of an oval in FIG. 2, the user interface 50 may take the form of any number of geometric patterns. Accordingly, as used herein, the term "peripherally surrounding" may refer to a first object (e.g., the first content region 54) that surrounds a second object (e.g., the central display region 52) at the external boundary or perimeter of the second object.

The first content region 54 may include a plurality of first interface elements 58 and the second content region 56 may include a plurality of second interface elements 60. The second interface elements 60 may be arranged into sets containing one or more second interface elements. For instance, the plurality of second interface elements 60 may include at least a first set of one or more second interface elements 62 and a second set of one or more second interface elements 64. The first set of second interface elements 62 may be associated with a first primary information category, while the second set of second interface elements 64 may be associated with a second primary information category that is different from the first primary information category. Thus, each second interface element 60 in a given set of second interface elements may belong or otherwise correspond to the same information category. Moreover, each second interface element 60 may have one or more corresponding first interface elements 58. The first interface elements 58 may be associated with a subcategory of their corresponding second interface elements 60. The relationships between first and second interface elements will be described in greater detail below with respect to FIGS. 3*a-d*.

Through the use of the input device 38, a user may control the movement of a cursor (not shown) over various interface elements contained in the user interface 50. A user may move the cursor over a desired interface element in any content level or region in order to display data related to the desired interface element. According to one or more embodiments, simply moving the cursor over an interface element is sufficient to "select" that interface element for the purpose of displaying data related thereto. The data corresponding to the selected interface element may be displayed in the central display region 52 as a generated result 66. As the cursor moves from one interface element to another, the data displayed in the central display region 52 as the generated result 66 may be correspondingly updated. Thus, the user interface 50 may permit a user to view, navigate and interact with large amounts of related data in a single display window with relative ease. Moreover, the user interface 50 may avoid several user ("mouse") clicks, menus, drop-downs and scrolling events that are typically required to view, navigate and interact with large amounts of related data in conventional interfaces.

According to one or more embodiments of the present application, the user interface 50 may selectively display a third content region 68 upon cursor movement over select first interface elements 58. For instance, the third content region 68 may appear in the central display region 52 adjacent to at least a portion of the first content region 54 upon cursor movement over a selected first interface element 70, as shown in FIG. 2. The third content region 68 may include a plurality of third interface elements 72 associated with a subcategory of the selected first interface element 70. The plurality of third interface elements 72 composing the third content region 68 may be further disposed in the central display region 52 proximate to the selected first interface element 70. A selection or cursor movement over another first interface element may cause the user interface 50 to selectively display a different third content region including a different set of third interface elements relating to the newly selected first interface element. Thus, while the first and second interface elements 58, 60 for a given user interface 50 may remain generally static, the plurality of third interface elements 72 may be dynamically displayed based on user input. Moreover, a selection or cursor movement over a third interface element 72 may likewise cause the user interface 50 to display data associated with the selected third interface element as the generated result 66 in the central display region 52.

As previously described, the generated result 66 may be displayed in the central display region 52. The generated result 66 may include digital content, information or other data corresponding to a "selected" interface element. The granularity of the data contained in the generated result 66 may depend on the content region or level of the interface element, which will be described in greater detail below. Additionally, the generated result 66 may include one or more selectable fourth interface elements 74. According to one or more embodiments, the selectable fourth interface elements 74 may be selected by clicking on the interface element. Further, in response to a selection of a fourth interface element 74, the user interface 50 may display a separate pop-up window (not shown) including content associated with the selected fourth interface element.

FIGS. 3a-d illustrate an exemplary user interface 50' for interactively displaying digital content on an electronic display device, such as display 40, in accordance with one or more embodiments of the present application. In particular, FIGS. 3a-d depict a user interface for displaying digital content relating to the National Football League (NFL), though the user interface may be similarly applied to other sports-related and non-sports-related information sources. Some examples of other sports-related applications may include the National Basketball Association (NBA), Major League Baseball (MLB), the National Hockey League (NHL), the National Collegiate Athletic Association (NCAA) football, NCAA basketball, various high school sports, and the like. The user interface can also be applied to display a large amount of related data for virtually any category of information that can be found in an online or offline directory (e.g., the Yellow Pages), such as golf courses, restaurants, nightspots, universities, movie theaters, museums, cardiologist, wedding planners, newspapers, real estate agents, contractors, hospitals, or the like.

As shown in FIGS. 3a-d, the geometrical user interface 50' can display in a single window of the display 40 details of a complete NFL season. With specific reference to FIG. 3a, the user interface 50' may include a central display region 52', a first content region 54' peripherally surrounding the central display region 52', and a second content region 56' peripherally surrounding the first content region 54'. The first content region 54' may include a plurality of first interface elements 58' and the second content region 56' may include a plurality of second interface elements 60'. The second interface elements 60' may be arranged into sets containing one or more second interface elements. For instance, the plurality of second interface elements 60' may include at least a first set of one or more second interface elements 62' and a second set of one or more second interface elements 64'. The first set of second interface elements 62' may be associated with a first primary information category, while the second set of second interface elements 64' may be associated with a second primary information category that is different from the first primary information category.

Figure 3A:
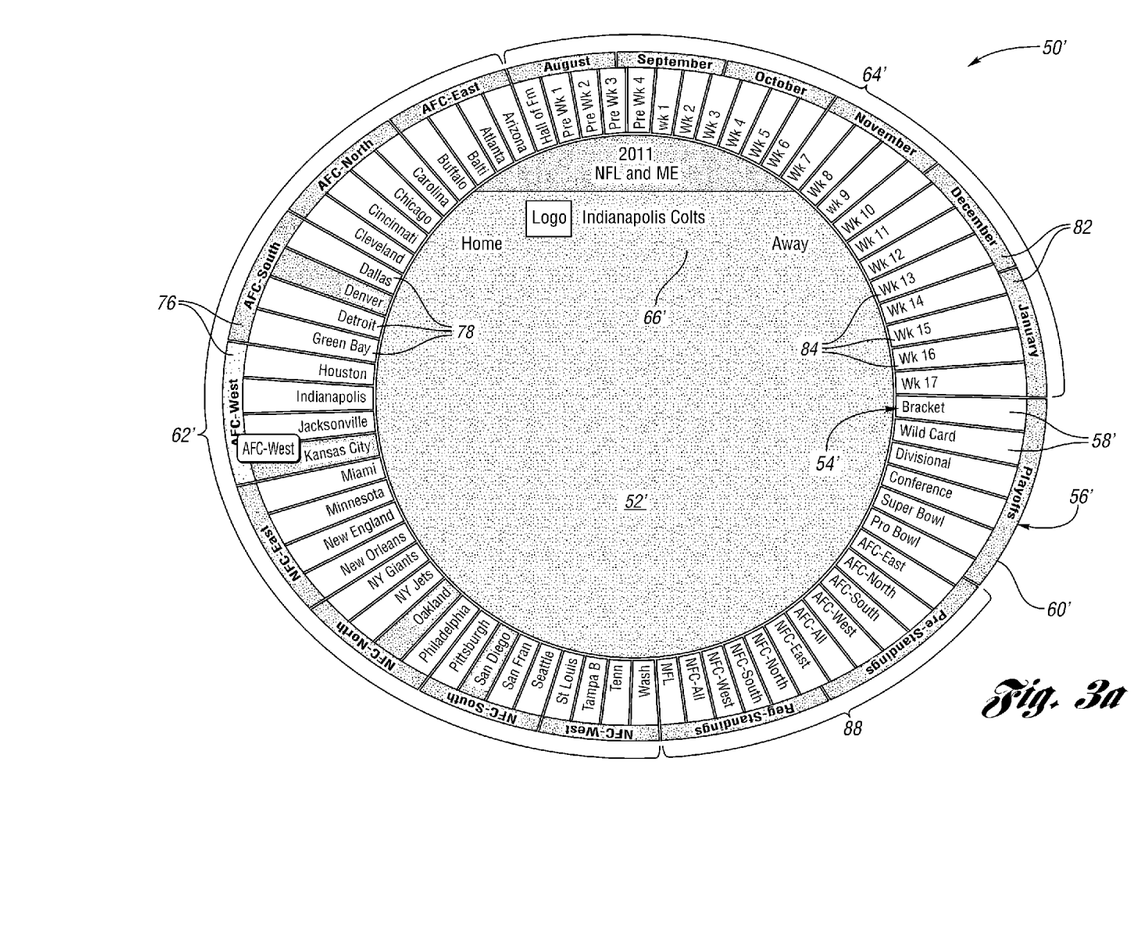

As shown, the first primary information category may relate to the teams that make up the sports league (e.g., NFL). Thus, each second interface element 60' in the first set of second interface elements 62' may correspond to a league division, which may be referred to herein as a league division interface element 76, and be labeled accordingly. Moreover, each second interface element 60' may have one or more corresponding first interface elements 58'. As previously described, the first interface elements 58' may be associated with a subcategory of their corresponding second interface element 60'. In this regard, each first interface element 58' associated with the first set of second interface elements 62' (e.g., the set of league division interface elements 76) may represent a team within the league, which may be referred to herein as a team interface element 78, and be labeled accordingly.

According to one or more embodiments of the present application, the team interface elements 78 may be arranged in the first content region 54' alphabetically adjacent to the league division interface elements 76 in the second content region 56'. In this manner, a cursor movement over a league division interface element (e.g., the AFC-West) may highlight the team interface elements corresponding to the teams within that league division (e.g., Denver, Kansas City, Oakland and San Diego). Additionally, specific content relating to the selected league division may be displayed in the central display region 52' as a generated result 66'.

Figure 3B:
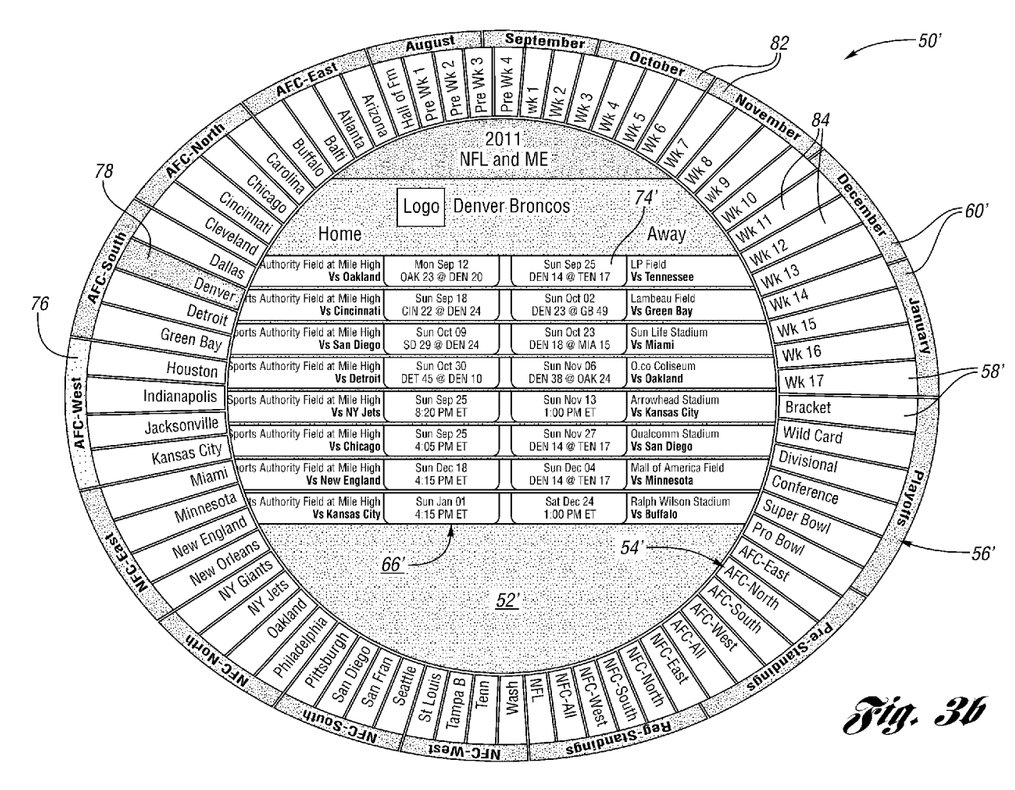

Referring now to FIG. 3b, a cursor movement over a team interface element 78 (e.g., Denver) may cause the user interface 50' to display content relating to the selected team in the central display region 52'. For example, the selected team's complete regular season schedule and associated data may be displayed in the central display region 52'. The displayed content may identify for each game the home team, the away team, the game venue, the game day and/or date, television and/or radio broadcast information, and the like. Additionally, for each completed game in the selected team's schedule, the user interface 50' may further display the game score, as well as an indicator identifying whether the selected team won or lost the game. For instance, the completed game information may be displayed with a green background indicating a win or a red background indicating a loss. For each future game in the selected team's schedule, the user interface 50' may further display an indicator indicating that the particular game is yet to be played, such as by displaying the game information with a white background.

Figure 3C:
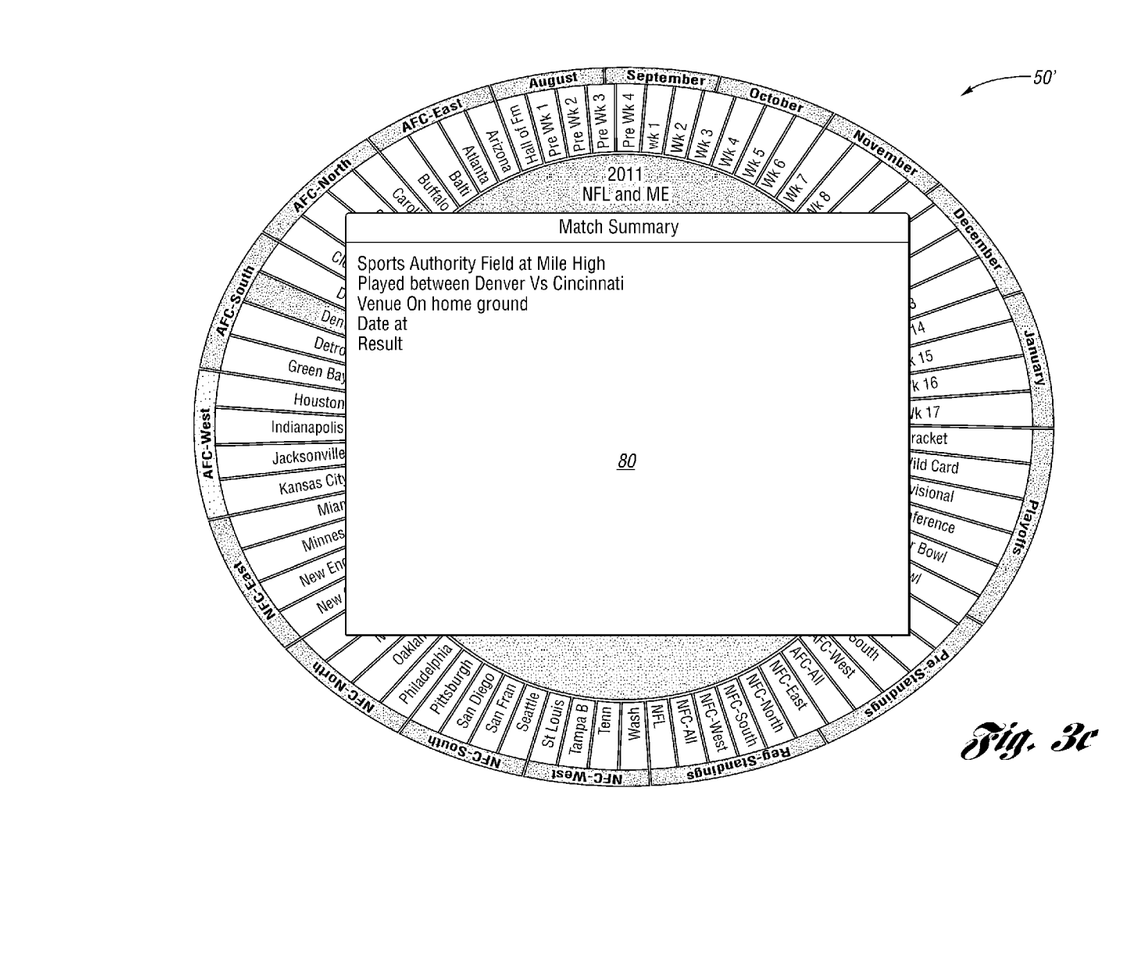

Each game displayed in the central display region 52' may also be associated with an interface element, such as a selectable fourth interface element 74'. Accordingly, a selection of any game displayed in the central display region 52' may cause a separate pop-up window 80 including content associated with the selected game to appear, as illustrated in FIG. 3c. The additional game-related content may include the display of or links to game photos, game video clips, game and player statistics, coupons, and the like. The user interface 50' may remain accessible in the background. Additional cascading pop-up windows 80 may appear with additional digital content upon the selection of particular interface elements within a pop-up window.

Referring back to FIG. 3a, the second primary information category may relate to the league schedule. The entire league season may be divided into smaller segments or time periods. Thus, each second interface element 60' in the second set of second interface elements 64' may correspond to a specific segment of time during which the season is played. For instance, each second interface element 60' in the second set of second interface elements 64' may correspond to a particular month in which league games are played, which may be referred to herein as month interface elements 82, and may be labeled accordingly. Moreover, each month interface element 82 may have one or more corresponding first interface elements 58'. In this regard, each first interface element 58' associated with the second set of second interface elements 64' (e.g., the set of month interface elements 82) may be associated with a particular week during which games may be played, which may be referred to herein as a week interface element 84, and be labeled accordingly.

According to one or more embodiments of the present application, the week interface elements 84 may be arranged in the first content region 54' chronologically adjacent to the month interface elements 82 in the second content region 56'. In this manner, a cursor movement over a month interface element 82 may highlight the week interface elements 84 corresponding to the weeks during a selected month in which games are played. Referring now to FIG. 3d, a cursor movement over a week interface element 84 (e.g., Week 15) may cause the user interface 50' to selectively display a third content region 68' in the central display region 52' adjacent to at least a portion of the first content region 54'. The third content region 68' may include a plurality of third interface elements 72' associated with a subcategory of the selected week interface element 84. As shown in FIG. 3d, each third interface element 72' associated with a week interface element 84 may correspond to a specific day during the selected week in which at least one game is played, which may be referred to herein as game day interface elements 86, and be labeled accordingly.

The game day interface elements 86 composing the third content region 68' may be further disposed in the central display region 52' proximate to the selected week interface element 84. A selection or cursor movement over another week interface element may cause the user interface 50' to selectively display a different third content region including a different set of game day interface elements relating to the newly selected week interface element. A selection or cursor movement over a game day interface element 86 may cause the user interface 50' to display data associated with the selected game day interface element as the generated result 66 in the central display region 52'.

According to one or more embodiments of the present application, user input corresponding to a selection of a game day interface element 86 may cause the user interface 50' to display a league-wide schedule of games that will be played (or that have been played) on the selected day. The displayed content may identify for each game the home team, the away team, team logos, the game venue, the game day and/or date, television and/or radio broadcast information, and the like. Additionally, for each completed game during the selected game day, the user interface 50' may further display the game score, as well as an indicator identifying the winning and losing teams. For instance, the winning team may be highlighted with a green background indicating a win and the losing team may be highlighted with a red background indicating a loss.

Each game displayed in the central display region 52' may also be associated with an interface element. Accordingly, a selection of any game displayed in the central display region 52' may cause a separate pop-up window 80 including content associated with the selected game to appear, as illustrated in FIG. 3c. The additional game-related content may include the display of or links to game photos, game video clips, game and player statistics, coupons, and the like. The user interface 50' may remain accessible in the background. Additional cascading pop-up windows 80 may appear with additional digital content upon the selection of particular interface elements within a pop-up window.

Referring back to FIG. 3a, the user interface 50' may include additional sets of one or more second interface elements 60'. The additional sets of interface elements may also be related to different primary information categories. For example, a third set of second interface elements 88 may be associated with league standings. Accordingly, the third set of second interface elements 88 may include a second interface element relating to pre-season standings and a second interface element relating to regular-season standings. Moreover, each second interface element 60' in the third set of second interface elements 88 may be associated with a plurality of first interface elements 58' including, for example, one for the entire league and one for each conference and each league division within a particular conference. A cursor movement over one of the first interface elements 58' may cause the standings associated with the selected first interface element to be displayed in the central display region 52'.

A set of one or more second interface elements 60' may be associated with a user-independent information category, such as the primary information categories described above (e.g., league teams, league schedule, league standings, etc.). Moreover, another set of one or more second interface elements may be associated with a user-dependent information category, such as a user's fantasy sports league information. Accordingly, a set of one or more second interface elements 60' may be associated with a user's fantasy sports. According to one or more embodiments of the present application, the corresponding first interface elements 58' may be associated with a user's fantasy sports team(s) or league(s), an office pool in which the user participates, fantasy statistics, and the like. Thus, the user-dependent content displayed in the central display region 52' may vary from one user to the next, whereas the user-independent content may be the same for any user.

Figure 4:
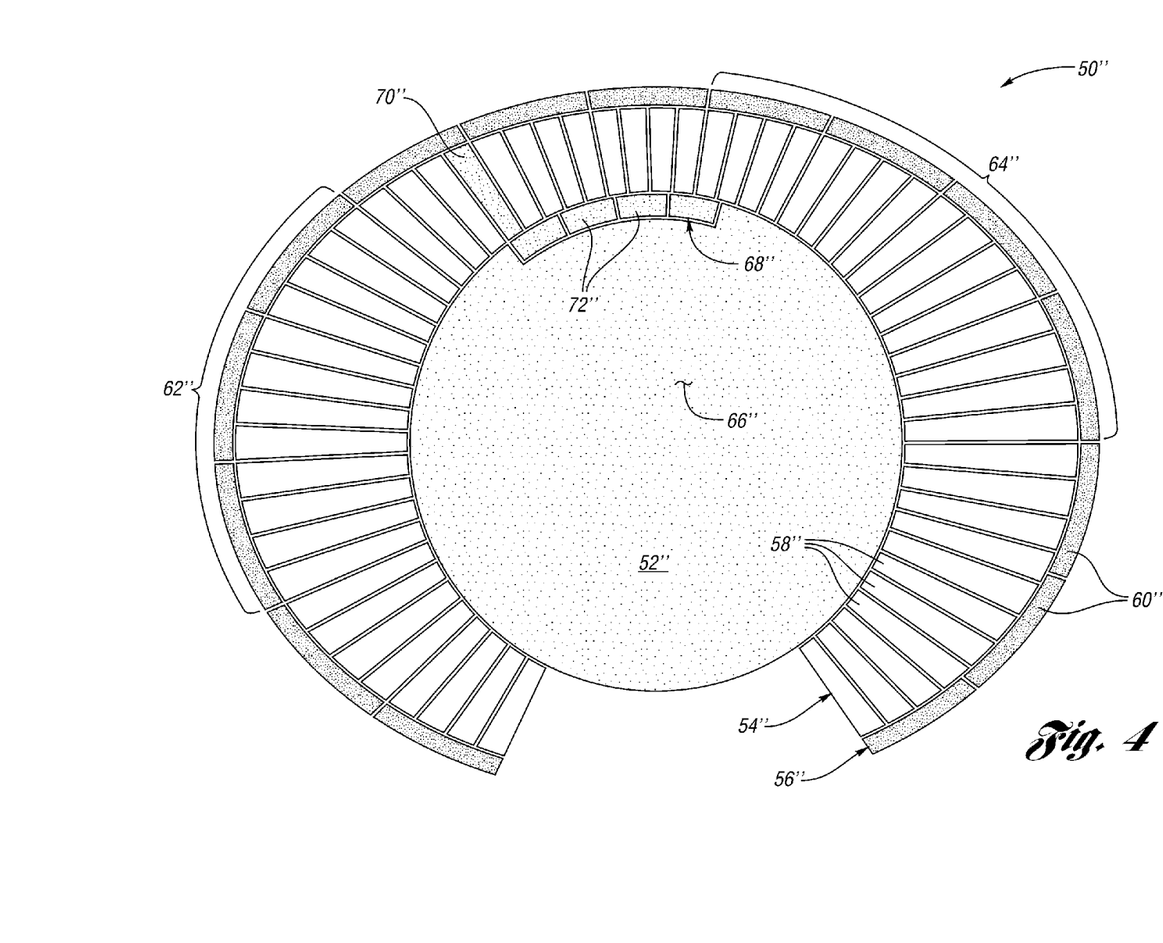
FIG. 4 is another exemplary electronic user interface in accordance with one or more alternate embodiments of the present application.

FIG. 4 illustrates another exemplary user interface 50" in accordance with one or more embodiments of the present application. The user interface 50" may include a central display region 52", a first content region 54" partially surrounding the central display region 52", and a second content region 56" at least partially surrounding the first content region 54". Although generally shown in the shape of a circle in FIG. 4, the user interface 50" may take the form of any number of geometric patterns. The first content region 54" may include a plurality of first interface elements 58" and the second content region 56" may include a plurality of second interface elements 60". The second interface elements 60" may be arranged into sets containing one or more second interface elements. For instance, the plurality of second interface elements 60" may include at least a first set of one or more second interface elements 62" and a second set of one or more second interface elements 64".

The first set of second interface elements 62" may be associated with a first primary information category, while the second set of second interface elements 64" may be associated with a second primary information category different from the first primary information category. Thus, each second interface element 60" in a given set of second interface elements may belong or otherwise correspond to the same information category. The first primary information category may be a user-independent information category and the second primary information category may be a user-dependent information category. Moreover, each second interface element 60" may have one or more corresponding first interface elements 58". The first interface elements 58" may be associated with a subcategory of their corresponding second interface element.

Through the use of the input device 38, a user may control the movement of a cursor (not shown) over various interface elements contained in the user interface 50". A user may move the cursor over a desired interface element in any content level or region in order to display data related to the desired interface element. According to one or more embodiments, simply moving the cursor over an interface element is sufficient to "select" that interface element for the purpose of displaying data related thereto. The data corresponding to the selected interface element may be displayed in the central display region 52" as a generated result 66". As the cursor moves from one interface element to another, the data displayed in the central display region 52" as the generated result may be correspondingly updated. Thus, the user interface 50" may permit a user to view, navigate and interact with large amounts of related data in a single display window with relative ease. Moreover, the user interface 50" may avoid several user ("mouse") clicks, menus, drop-downs and scrolling events that are typically required to view, navigate and interact with large amounts of related data in conventional interfaces.

According to one or more embodiments of the present application, the user interface 50" may selectively display a third content region 68" upon cursor movement over select first interface elements 58". For instance, the third content region 68" may appear in the central display region 52" adjacent to at least a portion of the first content region 54" upon cursor movement over a selected first interface element 70", as shown in FIG. 4. The third content region 68" may include a plurality of third interface elements 72" associated with a subcategory of the selected first interface element 70". The plurality of third interface elements 72" composing the third content region 68" may be further disposed in the central display region 52" proximate to the selected first interface element 70". A selection or cursor movement over another first interface element may cause the user interface 50" to selectively display a different third content region including a different set of third interface elements relating to the newly selected first interface element. Thus, while the first and second interface elements 58", 60" for a given user interface may remain generally static, the plurality of third interface elements 72" may be dynamically displayed based on user input. Moreover, a selection or cursor movement over a third interface element 72" may likewise cause the user interface 50" to display data associated with the selected third interface element as the generated result 66" in the central display region 52".

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for interactively displaying digital content on an electronic display device comprising:
   formatting for display an electronic user interface including:
      a central display region configured to display a generated result;
      a first content region peripherally surrounding the central display region, the first content region including a plurality of first interface elements;
      a second content region peripherally surrounding the first content region, the second content region including a plurality of second interface elements; and
      upon cursor movement over a selected first interface element, a third content region disposed within the central display region adjacent to at least a portion of the first content region proximate to the selected first interface element, the third content region including a plurality of third interface elements associated with a subcategory of the selected first interface element; and
   receiving input corresponding to a cursor movement over at least one of the first and second interface elements, wherein the generated result is based at least in part on the input;
   wherein the plurality of second interface elements includes at least a first set of one or more second interface elements associated with a first primary information category and a second set of one or more second interface elements associated with a second primary information category different than the first primary information category, and wherein each second interface element corresponds to one or more first interface elements and each first interface element is associated with a subcategory of its corresponding second interface element.

2. The method of claim 1, wherein the plurality of first interface elements and the plurality of second interface elements are relationally linked to content located in one or more databases containing related data.

3. The method of claim 1, wherein the plurality of first and second interface elements are static and the plurality of third interface elements are dynamic based upon the cursor movement over the selected first interface element.

4. The method of claim 1, wherein the generated result includes one or more selectable fourth interface elements.

5. The method of claim 4, further comprising;
   receiving input corresponding to a selected fourth interface element; and
   formatting the electronic user interface to display a separate pop-up window including content associated with the selected fourth interface element.

6. The method of claim 1, wherein the digital content relates to a sports league and the first primary information category is associated with league teams and the second primary information category is associated with a league schedule.

7. The method of claim 6, wherein each second interface element in the first set of one or more second interface elements corresponds to a different league division and each first interface element associated with the first set of one or more second interface elements is associated with a different league team.

8. The method of claim 6, wherein each second interface element in the second set of one or more second interface elements corresponds to a different month during a league season and each first interface element associated with the second set of one or more second interface elements is associated with a different week during the league season.

9. A method for interactively displaying digital content on an electronic display device comprising:
formatting for display an electronic user interface including:
a central display region configured to display a generated result;
a first content region peripherally surrounding the central display region, the first content region including a plurality of first interface elements; and
a second content region peripherally surrounding the first content region, the second content region including a plurality of second interface elements; and
receiving input corresponding to a selection of at least one of the first and second interface elements, wherein the generated result is based at least in part on the input;
wherein the plurality of second interface elements includes at least a first set of one or more second interface elements associated with a user-independent information category and a second set of one or more second interface elements associated with a user-dependent information category, and wherein each second interface element corresponds to one or more first interface elements and each first interface element is associated with a subcategory of its corresponding second interface element.

10. The method of claim 9, wherein the digital content relates to a professional sports league and the user-independent information category is associated with real professional sports league information and the user-dependent information category is associated with a user's fantasy sports league information.

11. The method of claim 9, wherein the plurality of first interface elements and the plurality of second interface elements are relationally linked to content located in one or more databases containing related data.

12. The method of claim 9, further comprising:
formatting the electronic user interface to further display a third content region upon cursor movement over a selected first interface element, the third content region disposed within the central display region adjacent to at least a portion of the first content region proximate to the selected first interface element, the third content region including a plurality of third interface elements associated with a subcategory of the selected first interface element.

13. The method of claim 12, wherein the plurality of first and second interface elements are static and the plurality of third interface elements are dynamic based upon the cursor movement over the selected first interface element.

14. The method of claim 9, wherein the generated result includes one or more selectable fourth interface elements.

15. The method of claim 14, further comprising;
receiving input corresponding to a selected fourth interface element; and
formatting the electronic user interface to display a separate pop-up window including content associated with the selected fourth interface element.

16. A method for interactively displaying digital content on an electronic display device comprising:
formatting for display an electronic user interface including:
a central display region configured to display a generated result;
a first content region partially surrounding the central display region, the first content region segmented into a plurality of first interface elements; and
a second content region at least partially surrounding the first content region, the second content region segmented into a plurality of second interface elements; and
receiving input corresponding to a cursor movement over at least one of the first and second interface elements, wherein the generated result is based at least in part on the input;
wherein the plurality of second interface elements includes at least a first set of one or more second interface elements associated with a user-independent information category and a second set of one or more second interface elements associated with a user-dependent information category, and wherein each second interface element corresponds to one or more first interface elements and each first interface element is associated with a subcategory of its corresponding second interface element.

17. The method of claim 16, wherein the digital content relates to a professional sports league and the user-independent information category is associated with real professional sports league information and the user-dependent information category is associated with a user's fantasy sports league information.

18. The method of claim 16, wherein the plurality of first interface elements and the plurality of second interface elements are relationally linked to content located in one or more databases containing related data.

19. The method of claim 16, further comprising:
formatting the electronic user interface to further display a third content region upon cursor movement over a selected first interface element, the third content region disposed within the central display region adjacent to at least a portion of the first content region proximate to the selected first interface element, the third content region including a plurality of third interface elements associated with a subcategory of the selected first interface element.

* * * * *